United States Patent [19]

Austin

[11] Patent Number: 4,877,568
[45] Date of Patent: Oct. 31, 1989

[54] PREPARATION OF PLASTIC EXTRUDATE CONTAINING AN ADDITIVE

[76] Inventor: Robert C. Austin, 1149 Romaine Cir. East, Jacksonville, Fla. 32225

[21] Appl. No.: 195,255

[22] Filed: May 18, 1988

[51] Int. Cl.⁴ .......................................... B29C 47/10
[52] U.S. Cl. .......................... 264/211.21; 264/176.1; 264/211; 264/349; 264/DIG. 65; 366/76; 425/207; 425/379.1
[58] Field of Search ............... 264/211.21, 211, 176.1, 264/349, DIG. 65; 366/76; 425/207, 208, 379.1, 378.1

[56] References Cited

U.S. PATENT DOCUMENTS

| | | | |
|---|---|---|---|
| 3,121,914 | 2/1964 | Olson et al. | 425/208 |
| 3,484,507 | 12/1969 | Smith | 425/379.1 |
| 3,679,788 | 7/1972 | Kiyono et al. | 264/349 |
| 3,790,327 | 2/1974 | Haberle | 264/176.1 |
| 3,907,963 | 9/1975 | Blackmon | 264/211 |
| 3,966,857 | 6/1976 | Charlton et al. | 264/349 |
| 4,405,239 | 9/1983 | Chung et al. | 425/208 |
| 4,530,732 | 7/1985 | Horn | 264/349 |
| 4,657,499 | 4/1987 | Lewellen et al. | 425/208 |

Primary Examiner—Jeffery Thurlow
Attorney, Agent, or Firm—Pravel, Gambrell, Hewitt, Kimball & Krieger

[57] ABSTRACT

Pellets of polymeric material are fed into the hopper of a screw extruder to produce a molten extrudate, and a liquid additive, particularly a molten lubricant, is introduced downstream of the hopper into the root of a screw flight, particularly in the feed section of the screw longitudinally and internally of the screw shaft.

25 Claims, 1 Drawing Sheet

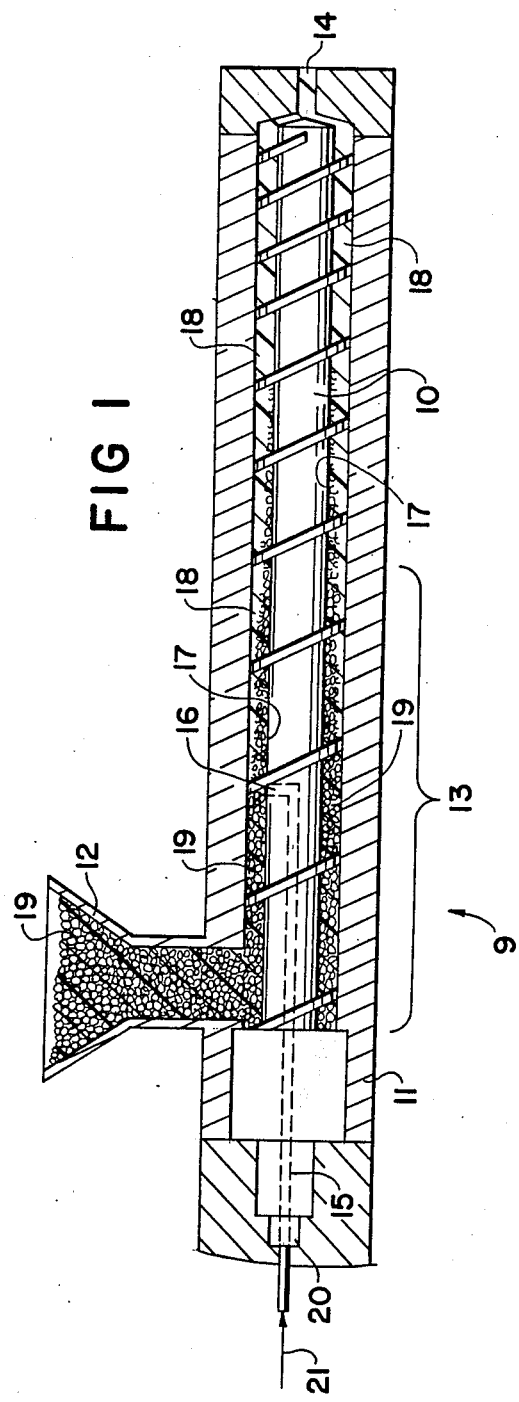
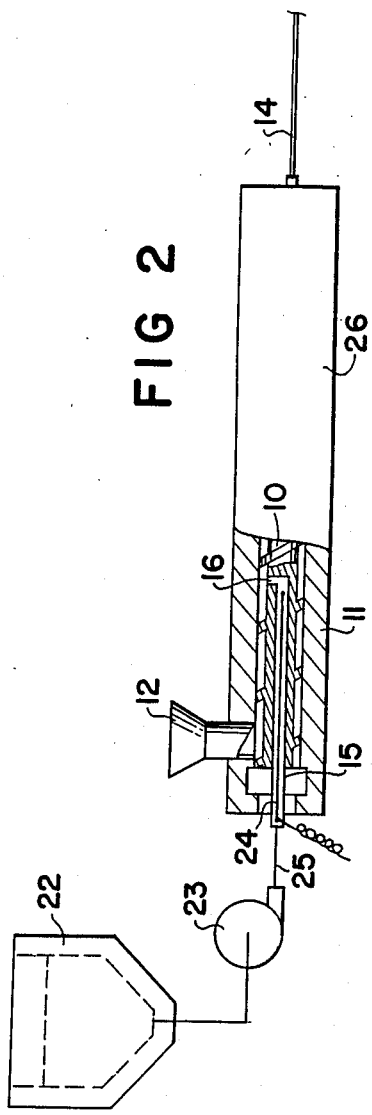

PREPARATION OF PLASTIC EXTRUDATE CONTAINING AN ADDITIVE

BACKGROUND OF THE INVENTION

Synthetic plastic polymers are normally sold in a granular or pellet form for further processing into articles of various shapes and forms for ultimate use by the consuming public. Such articles may be films, fibers, bottles, containers, strips, rods, and molded articles. The processing which transforms the pellets into the final article usually involves heating the pellets to form a molten, viscous liquid mass which is then passed through devices to solidify the molten mass into a final shape. The normal type of process machinery to accomplish this transformation is a screw extruder which introduces friction, heat and pressure to melt the pellets and causes good mixing in the molten mass as it is pushed through the extruder. While in the molten phase there may be any of several additives incorporated therein, e.g. dyes or pigments for coloring, ultraviolet light absorbers for protection against deterioration by sunlight, antioxidants to decrease or eliminate deterioration by oxygen in the air, and lubricants to facilitate the processing of a highly viscous melt which sticks tenaciously to surfaces of the processing equipment. In some instances the additive is mixed with the pellets at the hopper, but in other instances it is not feasible to do so.

In the case of a waxy additive it cannot be introduced at the hopper because of its adverse effect on the normal mixing and frictional requirements in a screw extruder. The screw turns in a stationary barrel causing the pellets to be compressed against the barrel and to produce large amounts of frictional heat which enhances the melting of the pellets. This effect is basic to an extruder. When the waxy additive is introduced through the hopper it materially reduces the frictional drag at the barrel and delays or materially prohibits the proper melting of the pellets and the throughput of the extruder. On the other hand, the surface of the screw also produces frictional heating, causing the pellets to move along the screw as they change into the molten phase and exit from the extruder. It is particularly desirable for the melting to occur at the barrel surface and not at the screw surface. Accordingly, there has been a need to provide a method for adding a waxy material, e.g., a lubricant at the interface of the pellets and the screw, but not at the interface of the pellets and the barrel. The present invention meets this need in the plastic extruder art.

Within the scope of this invention a screw extruder encompasses not only the commonly known extrusion devices, but also any apparatus used to feed or blend additives introduced into plastic materials, and other forming apparatus for plastic materials using the principle of a rotating screw. Some injection molding apparatus and screw rams employ such screw devices and are to be included within the term "screw extruder" in this invention.

It is an object of this invention to provide an improved process for preparing an additive modified polymeric extrudate. It is another object of this invention to provide a method for incorporating a waxy material such as a lubricant, into a plastic extrudate with a substantial reduction in the power consumption of the extruder. A further object is the provision of an additive to a plastic extruder which lubricates the screw and not the barrel until substantially all the plastic pellets are melted or until mixing of the plastic pellets occurs downstream of the feed section whereby the throughput of the machine is enhanced in the feed section as well as in the melt section thereof. Still other objects will become apparent from the more detailed description which follows.

BRIEF SUMMARY OF THE INVENTION

This invention relates to a process for preparing a molten plastic extrudate mixed with an additive, which comprises introducing plastic pellets into a screw extruder, introducing into such plastic in the extruder, downstream of the point of introduction of such pellets, an additive in liquid form, and recovering the plastic in a molten phase with the additive intimately dispersed therein.

In preferred embodiments of the invention, polypropylene pellets are fed into a screw extruder, and molten waxy lubricant is injected into a flight of the screw extruder in the feed section thereof through a generally lateral passageway through the screw and exiting into the root of the screw under such conditions that the lubricant solidifies and remains generally on the pellets at the root of the screw flight to reduce the friction between the screw and the pellets in the feed section and enhances the flow of melted plastic in the melt section of the extruder thereby reducing the power consumption while enhancing the throughput of the extruder.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a longitudinal cross sectional view of a screw extruder operating according to the process of this invention; and FIG. 2 is a schematic illustration of the process equipment employed in accord with this invention.

DETAILED DESCRIPTION OF THE INVENTION

The process of this invention relates to a method for incorporating an additive, particularly a lubricant, into an extruded polymeric article. The preferred procedure is illustrated in the accompanying drawings of FIGS. 1 and 2. Granules 19 of a plastic polymer are fed through hopper 12 into a screw extruder 9, including a stationary barrel 11 (most often heated) and an internally rotating screw 10. In the feed section 13, which normally includes the first few flights of screw 10 following the hopper 12, is injected a molten additive, e.g. a lubricant, through a central axial longitudinal passageway 15 connected to a generally lateral passageway 16 that empties at the root 17 of a screw flight. The root 17 of the screw 10 is the surface at the bottom of a screw flight, i.e., the smallest diameter of any part of the surface of screw 10. Special sealed unions or fittings are known in the art to connect a stationary passageway to a rotating passageway. Such a fitting is employed at 20 to permit the additive to be fed in via conduit 21 through passageway 15 and to exit at the end of lateral passageway 16.

The additive must be in liquid form, preferably in molten form, so as to be pumpable through a small passageway sauch as 15 or 16. If the additive is waxy, such as a lubricant, it should have a melting point above 20°–30° C. Among such lubricants are the waxes and soaps of high molecular weight aliphatic hydrocarbons, i.e. acids, amides, and esters having a molecular chain of about 18 to 30 carbon atoms. Included in this group of compounds are stearates, oleates, erucates, eicosanates, etc. A particularly preferred material is erucamide which has a melting point of about 80° C., a density at 130° C. of about 0.82 g/ml and a viscosity at 130° C. of about 6.4 centipoises. The melting point requirements may vary for different types of additives; e.g. a lubricant must have a melting point above the temperature of the granules where the lubricant is first injected onto the granules. In the case where the additives are introduced into unmelted granules, the granules will be at a temperature of about 20° to 80° C. and the lubricant will be in a liquid state, e.g., as by melting and heating to a temperature of about 80° C. Other additives which also may be introduced into a plastic mixture for extrusion include pigments, dyes, stabilizers, tackifiers, catalysts, antioxidants, etc.

The plastic material employed in this invention is normally a powder, chips, pellets, or the like, all of which are considered to be granules. Pellets are the most common form being used in the industry at present. The pellets 19 introduced into the hopper 12 of the screw extruder are pushed forward through feed section 13, being heated and compressed in this travel. At the point of injection through lateral passageway 16 of the additive, the pellets are about 20°–80° C. in temperature. If the additive is a lubricant, it is introduced in a very small amount, e.g. about 0.1 to about 1.0% by weight of the pellets, and in that small amount the molten lubricant is immediately solidified on the surface of the adjacent pellets next to the root of the screw. Generally the additive must be heated to keep it molten as it passes through passageway 15 or 16. An electric resistance heater 24 (FIG. 2) preferably is inserted into passageway 15 to maintain the additive in a liquid molten condition. A lubricant introduced in this way does not permeate through the pellets but remains on those pellets near the root of the screw, and the rotation of the screw does not produce any substantial mixing of the pellets among themselves, particularly in the feed section. Accordingly, the lubricant reduces the frictional forces between the pellets and the screw, making it easier to turn the screw and reduces the power consumption necessary to produce the well-mixed molten extrudate while enhancing the throughput of the plastic through the extruder. Any other waxy additive provides substantially the same advantages.

Any type of granular thermoplastic polymeric material may be treated in accordance with this process, e.g., polyolefins, polyamides, polyacrylics, polyacetals, polyvinyl halides or esters, polyesters, and the like. A preferred material is polypropylene which is a very useful polyolefin that is somewhat difficult to process because of its high frictional properties. Polypropylene, however, has found wide utility as carpet fiber, strapping for fastening containers and other molded shapes and forms. In the case of some carpet fiber and some strapping materials, it is desirable that the finished article have some lubricant on its surface to make it easier to further process the article, i.e., make the fiber into a carpet or use the strapping to bind a container. The lubricant in such articles exudes to the surface and is therefore automatically available to make tufting and weaving operations of the fiber function smoother, and to make it easier to vibrate strapping against itself when being welded to itself by friction.

The amount of lubricant can vary with the polymer used and with the product desired. Generally from about 0.1% to about 1.0% lubricant is introduced into the pellets based on weight. A preferred amount for erucamide with polypropylene is about 0.15 to 0.5%.

Any type of screw extruder may be employed in this process so long as it has a feed section where pellets are being compressed and heated prior to melting. An especially advantageous screw for producing molten lubricated polypropylene is that described and claimed in U.S. Pat. No. 4,405,239 (Robert Barr, Inc. of Virginia Beach, Va.). In this type screw the unmelted lubricated pellets are mixed with the melt downstream of the feed section which intimately diperses the lubricant in the melt and enhances the melt flow therefrom to assist in improving the throughput of the extruder.

A desirable process is shown in FIG. 2 where the additive, especially a lubricant, is kept molten in a heated reservoir 22 which feeds into a metering pump 23 and the pumped liquid additive enters extruder 26 through pipe 25. Inside extruder 26 is a longitudinal passageway 15 communicating with a lateral passageway 16 which empties into a screw flight near the root of the screw 10 which is turning inside barrel 11 and receiving granular plastic through hopper 12. Electric resistance heater 24 is inserted in passageway 15 to keep the additive in a liquid state. Extrudate 14 containing the additive exits the extruder 9 in a manner known in the art.

In experimental testing of this process using an extruder screw of U.S. Pat. No. 4,405,239, polypropylene was extruded using erucamide as a lubricant, (a) with no lubricant added, (b) with lubricant added to the hopper, and (c) with lubricant added in accordance with this invention. A 20–30% reduction in polymer extrudate production occurred when using procedure (b) as compared with control (a). A 5.5% reduction in power input was experienced with no change in polymer extrudate production using procedure (c) as compared to control (a).

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for incorporating an additive into a molten plastic mass which comprises introducing granular thermoplastic material into a screw extruder, introducing a liquid additive material into the unmelted granular material substantially at the root of the screw downstream of the location of introducing granular thermoplastic material into the screw extruder, and recovering a stream of molten thermoplastic with the additive material intimately dispersed therein.

2. The process of claim 1 wherein said additive is a waxy material having a melting point above the temperature of the granular material at the point of introduction of the additive into the thermoplastic material.

3. The process of claim 1 wherein the additive is a lubricant.

4. The process of claim 3 wherein the lubricant is erucamide.

5. The process of claim 1 which includes heating the additive externally of the extruder, propelling the heated additive into the extruder through an axial passageway exiting into the root of a flight of the screw of the extruder, and maintaining the heated additive in a liquid form while traversing the passageway.

6. A process for preparing a lubricated molten plastic extrudate which comprises introducing plastic granules into a screw extruder, introducing at the root of the screw into a flight containing unmelted granules in the extruder, downstream of the point of introduction of the granules, a molten lubricant having a melting point above the temperature of the granules at the point of injection of the molten lubricant, and recovering plastic in a molten phase with said lubricant intimately dispersed therein.

7. The process of claim 6 wherein the plastic is polyolefin, polyacetal, polyvinyl, polyamide, polycarbonate, or polyester.

8. The process of claim 7 wherein the plastic is polypropylene.

9. The process of claim 6 wherein the lubricant is a high molecular weight acid, ester, or amide.

10. The process of claim 9 wherein the lubricant is erucamide.

11. The process of claim 10 wherein the erucamide is at a temperature of about 80° C. while the plastic granules in the screw extruder at the point of introduction are at a temperature below 80° C.

12. The process of claim 10 wherein the amount of the erucamide is about 0.1 to about 10% by weight of the plastic.

13. The process of claim 6 wherein the point of introduction is into a mass of the plastic granules under pressure in a flight of the screw in the feed section of the extruder.

14. The process of claim 6 wherein the step of introducing includes the initial introduction into the plastic in the extruder through a passageway along the central longitudinal axis of the screw of the extruder and then through a communicating lateral passageway exiting into the root of a screw flight of the extruder.

15. A process for preparing a molten polyolefin extrudate containing a lubricant, the process comprising the steps of:
 a. feeding granules of polyolefin into the hopper of a screw extruder having a feed section and being capable of transforming the granules into a molten stream;
 b. injecting into the unmelted granules in the feed section adjacent the root of the screw a molten lubricant having a melting point below the temperature of the granules at the point of injecting; and
 c. recovering from the exit of the screw extruder a molten stream of polyolefin with the lubricant intimately and uniformly distributed therethrough.

16. The process of claim 15 wherein the polyolefin is polypropylene.

17. The process of claim 15 wherein the lubricant is an ester or an amide of $C_{18}$ to $C_{30}$ aliphatic acid.

18. The process of claim 15 wherein the lubricant is erucamide.

19. The process of claim 15 wherein the granules of polyolefin are at a temperature of below about 80° C. at the point of injecting the lubricant at a temperature of about 80° C.

20. The process of claim 15 wherein the lubricant is introduced into the granules through a longitudinal passageway along the axis of rotation of and into the screw and a communicating lateral passageway from the longitudinal passageway into the feed section of the screw at the root of a screw flight.

21. The process of claim 21 wherein the lubricant is heated externally of the screw.

22. The process of claim 20 wherein the lubricant is heated in the longitudinal passageway.

23. The process of claim 20 wherein the lubricant is heated externally of the screw and internally of the screw in the longitudinal passageway.

24. The process of claim 23 wherein the lubricant is pumped into the longitudinal passageway.

25. The process of claim 15 wherein the lubricant is forcibly metered into the unmelted granules along the surface of the granules contiguous with the root of the screw of the extruder by passing the lubricant heated externally of the screw through a longitudinal passageway along the rotative axis of the screw and then through a lateral communicating passageway exiting at the root of a screw flight and heating the lubricant while it is passing through the longitudinal passageway.

* * * * *

UNITED STATES PATENT AND TRADEMARK OFFICE
CERTIFICATE OF CORRECTION

PATENT NO. : 4,877,568

DATED : October 31, 1989

INVENTOR(S) : Robert C. Austin

It is certified that error appears in the above-identified patent and that said Letters Patent is hereby corrected as shown below:

On the face of the patent, insert -- Assignee: Container Strapping, Inc., Jacksonville, Fla. --. Column 2, line 40, delete "." and insert ":". Column 3, line 3, delete "sauch" and insert -- such --; column 3, line 13, delete "centipoises" and insert-- centipoise --. Column 4, line 19, delete "diperses" and insert -- disperses --. In claim 17, column 6, line 18, insert -- a -- before $C_{18}$; In claim 21, column 6, line 31, change "The process of claim 21" to -- The process of claim 20 --.

Signed and Sealed this

Fifth Day of June, 1990

Attest:

HARRY F. MANBECK, JR.

Attesting Officer

Commissioner of Patents and Trademarks